United States Patent [19]

Shuto et al.

[11] Patent Number: 5,412,215

[45] Date of Patent: May 2, 1995

[54] METHOD AND SYSTEM CAPABLE OF TUNING SCINTILLATION CAMERA BY SMALL NUMBER OF LIGHT REFERENCES

[75] Inventors: Keisei Shuto; Tsutomu Yamakawa, both of Tochigiken, Japan

[73] Assignee: Kabushiki Kaisha Toshiba, Tokyo, Japan

[21] Appl. No.: 957,783

[22] Filed: Oct. 8, 1992

[30] Foreign Application Priority Data

Oct. 8, 1991 [JP] Japan .................. 3-260363

[51] Int. Cl.$^6$ .................. G01T 1/164; G01T 1/208
[52] U.S. Cl. .................. 250/363.09; 250/369
[58] Field of Search .................. 250/252.1 A, 252.1 R, 250/363.09, 369, 207

[56] References Cited

U.S. PATENT DOCUMENTS

| | | | |
|---|---|---|---|
| 4,079,257 | 3/1978 | Jatteau et al. | 250/363.07 |
| 4,605,856 | 8/1986 | Persyk et al. | 250/262 X |
| 4,764,678 | 8/1988 | Yamakawa | 250/369 |
| 5,004,904 | 4/1991 | Yamakawa et al. | 250/369 X |
| 5,237,173 | 8/1993 | Stark et al. | 250/252.1 |

Primary Examiner—Constantine Hannaher
Assistant Examiner—Edward J. Glick
Attorney, Agent, or Firm—Oblon, Spivak, McClelland, Maier & Neustadt

[57] ABSTRACT

In a scintillation camera system, a total number of reference light sources such as LEDs is considerably reduced with reference to a total number of photomultiplier tubes, and a defect occurring in either the reference light source, or the photomultiplier tube can be detected. The scintillation camera system includes: a plurality of photomultiplier tubes (4A:4N) for outputting scintillation signals; at least three reference light sources (5A:5B:5C) positioned continuous to the plurality of photomultiplier tubes (4A:4N), one of these plural photomultiplier tubes (4A:4N) being separated from the three reference light sources at an equidistance; a signal processing unit (6) for processing the scintillation signal outputs from the plural photomultiplier tubes (4A:4N) to produce feedback signals; and a controlling unit (7) for controlling radiation from the reference light sources (5A:5B:5C) in response to the feedback signals.

10 Claims, 7 Drawing Sheets

107 PHOTOMULTIPLIER TUBES & 31 LEDS

METHOD AND SYSTEM CAPABLE OF TUNING SCINTILLATION CAMERA BY SMALL NUMBER OF LIGHT REFERENCES

BACKGROUND OF THE INVENTION

1. Field of the Invention

The present invention generally relates to a method and a system for tuning a scintillation camera having a plurality of photomultiplier tubes by a limited number of reference light sources. More specifically, the present invention is directed to a method for detecting a defect of either reference light sources, or photomultiplier tubes employed in a scintillation camera system, and also to a scintillation camera system capable of performing an automatic defect analysis.

2. Description of the Prior Art

Various types of scintillation camera systems have been widely utilized in the medical electronic field so as to achieve a high-precision nuclear medical diagnosis. A scintillation detector constitutes a major portion of such a scintillation camera system. A typical structure of this scintillation detector is constructed of a scintillator made of a single crystal (NaI: sodium iodide) sandwiched by an aluminum plate functioning as a protector and a glass plate. Furthermore, this scintillation detector is arranged by a light guide and a plurality of photomultiplier tubes. In the scintillation detector, gamma rays emitted from radioisotopes injected into a biological body under medical examination, e.g., a patient, impinge via a collimater onto the single crystal of the scintillator. Thus, the scintillator converts gamma rays into visual light, as scintillation light. The scintillation light is conducted through the light guide to a plurality of photomultiplier tubes. Then, tile scintillation light is converted into a scintillation signal which will then be amplified. The amplified scintillation signal is processed in a detector signal processor, so that positional information and energy information of the impinged gamma rays are analyzed to obtain a desirable nuclear medical image of the patient.

To equalize sensitivities of these photomultiplier tubes which are severely influenced by the environment around this scintillation detector, an output controlling unit has been employed in tile conventional scintillation camera system. In tile output controlling unit, plural reference light sources such as LEDs (light emitting diodes) are provided with a plurality of photomultiplier tubes in such a manner that each LED is positioned adjoining to each photomultiplier. In other words, the total number of LEDs is equal to that of the photomultiplier tubes. To control the output signals of the photomultiplier tubes, the output (detection) signals from the photomultiplier tubes while the LEDs are energized and emit the reference light, are fed back to the detector signal processing circuit in a real time mode. Such a conventional scintillation camera system with the output controlling unit is described in, for instance, U.S. Pat. No. 5,004,904, patented on Apr. 2, 1991, issued to Yamakawa et al.

In tile above-described conventional scintillation camera system, since a large number of reference light sources (equal to the photomultiplier tubes, normally more than 100) are employed to equalize the output signals of the photomultiplier tubes, a quantity of relevant circuit arrangements such as pulsatory light ignition circuits similarly becomes large. Accordingly, complex circuit arrangements and expensive manufacturing costs are required in the conventional scintillation camera system. Furthermore, even when the reference light source becomes defective and thus light emission thereof is lowered, since variations in tile sensitivities of the photomultiplier tubes are different from each other, such a defective phenomenon of tile reference light source cannot be easily detected, resulting in deteriorating reliability of the conventional output control unit.

On the other hand, a total number of reference light sources is reduced, as compared with a total number of photomultiplier tubes, in another conventional scintillation camera system as described in European Patent Application (publication No. 0066768, published on Dec. 15, 1982). In this scintillation camera system, only 11 LEDs are approximately distributed among 37 photomultiplier tubes in such a manner that most of the photomultiplier tubes are continuous to a light emitting diode. Then, automatic amplification control is carried out. However, since there are very severe restrictions about, for instance, tile light emitting characteristics of LEDs with respect to a lapse of time, and also the mechanically stable positions of LEDs, satisfactory sensitivity correction of tile photomultiplier tubes can hardly be realized. In addition, no amplification control for one photomultiplier tube positioned not immediately adjoining to three LEDs separated from each other at an equidistance, is carried out by processing output signals simultaneously derived from these LEDs.

SUMMARY OF THE INVENTION

The present invention has been made in an attempt to solve the above-described problems of the conventional scintillation camera systems, and therefore has an object to provide a scintillation camera system capable of improving reliability of output signals from a plurality of photomultiplier tubes employing a few reference light sources, as compared with photomultiplier tubes.

Another object of the present invention is to provide a method for detecting either a defect in light emissions off the reference light sources, or a variation in output signals from the photomultiplier tubes.

A still further object of the present invention is to provide a method for automatically distinguishing the defect occurring in the reference light sources from the variations of the tube outputs.

The above-described objects and other features of the present invention are achieved by: a method for detecting a defect in a scintillation camera wherein at least one reference light source is commonly used with respect to a plurality of photomultiplier tubes, and a total number of the reference light sources is smaller than that of the photomultiplier tubes, comprising the steps of:

presetting a reference light gain of at least said one reference light source into a memory;

irradiating light from said one reference light source to said plurality of photomultiplier tubes, thereby obtaining scintillation signals having gains;

sequentially comparing the gain of the scintillation signals derived from the respective photomultiplier tubes with said reference gain of the reference light source read out from the memory; and judging whether or not a variation contained in the compared gains of the respective photomultiplier tubes exceeds a predetermined value, thereby detecting a defect of said reference light source.

Also, according to another aspect off the present invention, a scintillation camera system comprises:
- a plurality of photomultiplier tubes for outputting scintillation signals;
- at least three reference light sources positioned contiguous to said plurality of photomultiplier tubes, one of said plural photomultiplier tubes being separated from said three reference light sources at an equidistance;
- signal processing means for processing the scintillation signal outputs of said plural photomultiplier tubes to produce feedback signals; and
- controlling means for controlling radiation from said reference light sources in response to the feedback signals in order.

Furthermore, according to a further aspect of the present invention, a method for detecting a defect in a scintillation camera wherein at least one reference light source is commonly used with respect to a plurality of photomultiplier tubes, and a total number of the at least one reference light source is smaller than that of the photomultiplier tubes, comprising the steps of:
- presetting a reference gain of a scintillation signal of at least a first photomultiplier tube into a memory;
- irradiating light from said one reference light source to said plurality of photomultiplier tubes including said first photomultiplier tube, thereby producing scintillation signals having gains respective to the photomultiplier tubes; and
- sequentially comparing the gains of the scintillation signals derived from the respective photomultiplier tubes with said reference gain of the scintillation signal of the first photomultiplier tube read out from the memory, whereby a defect of said photomultiplier tubes is judged by checking whether or not said compared gains of the respective photomultiplier tubes exceeds a predetermined valve.

Also, according to a still further aspect of the present invention, a scintillation camera for periodically tuning a plurality of photomultiplier tubes by reference light sources producing sequential light emissions, comprising:
- an array of at least ten photomultiplier tubes; and
- at least three reference light sources for sequentially producing reference light emissions, nine of said ten photomultiplier tubes being juxtaposed with said three reference light sources, and the remaining photomultiplier tube being separated at an equidistance from said three reference light sources

BRIEF DESCRIPTION OF THE DRAWINGS

For a better understanding of the present invention, reference is made of the following detailed description in conjunction with the accompanying drawings, in which.

DETAILED DESCRIPTION OF THE PREFERRED EMBODIMENT

Overall Arrangement Of First Scintillation Camera System

Figure 1:
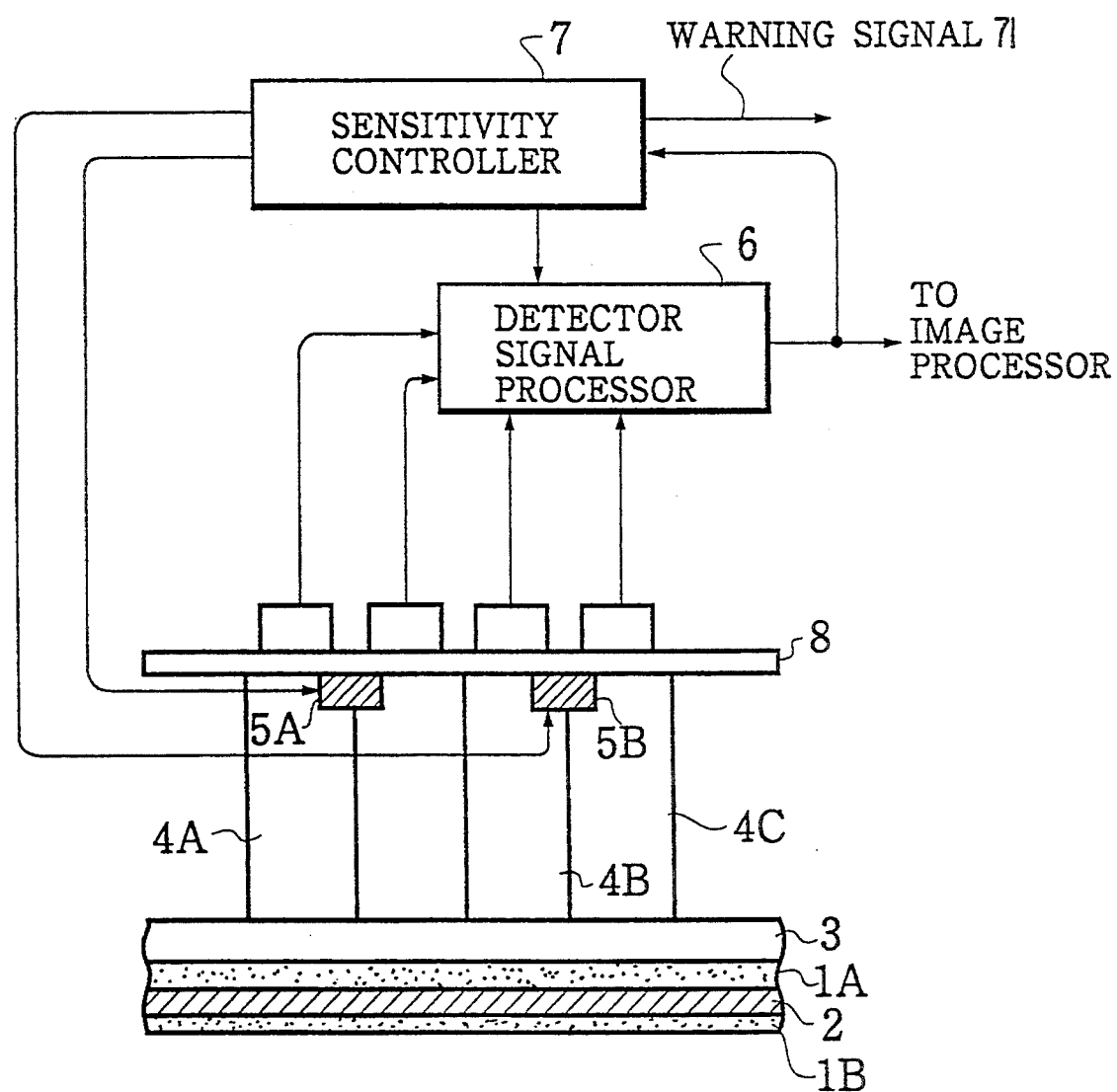
FIG. 1 schematically represents a major arrangement of a scintillation camera system according to a first preferred embodiment of the present invention.

Referring now to FIG. 1, a major arrangement of a scintillation camera system according to a first preferred embodiment of the present invention will be explained. That is, in a lower portion of this drawing, a scintillation detector is represented. The scintillation detector is constructed of a scintillator, a light guide 3, and a plurality of photomultiplier tubes 4A, - - -, 4N ("N" being an integer, for instance 107 in the first preferred embodiment, see FIG. 2). The scintillator is arranged by a single crystal 2 of sodium iodide (NaI), and a glass plate 1A and also an aluminium plate 1B, which mechanically protect the NaI single crystal 2.

The NaI single crystal 2 of this scintillator emits scintillation light upon receipt of gamma rays projected from radioisotopes which have been injected into a biological body (not shown) under medical examination, e.g., a patient. This scintillation light is received by a plurality of photomultiplier tubes 4A, - - -, 4N arranged on the light guide 3. The scintillation light is converted into a photon signal and then the photon signal is amplified in the photomultiplier tubes 4A, - - - , 4N to obtain a scintillation signal containing positional information and energy information of the scintillation light detected by the scintillator 2. The scintillation signal is supplied to a detector signal processing unit 6.

In the detector signal processing unit 6, both incident positions of the gamma rays and incident energy thereof are analyzed. An output signal from the detector signal processor 6 is supplied to a sensitivity controlling unit 7 and also to an image (scintigram) processing unit (not shown in detail). In the image processing unit, a scintillation image (scintigram) is produced based upon the analyzed positional information and energy information of the incident gamma rays.

The sensitivity controlling unit 7 equalizes the sensitivities of the photomultiplier tubes 4A to 4N that are varied in accordance with peripheral environments of the scintillation camera system, e.g., temperatures and magnetic fields. Problems are outputted by the sensitivity controller by warning signal 71.

POSITIONAL RELATIONSHIP BETWEEN LED AND PHOTOMULTIPLIER TUBE

Figure 2A:
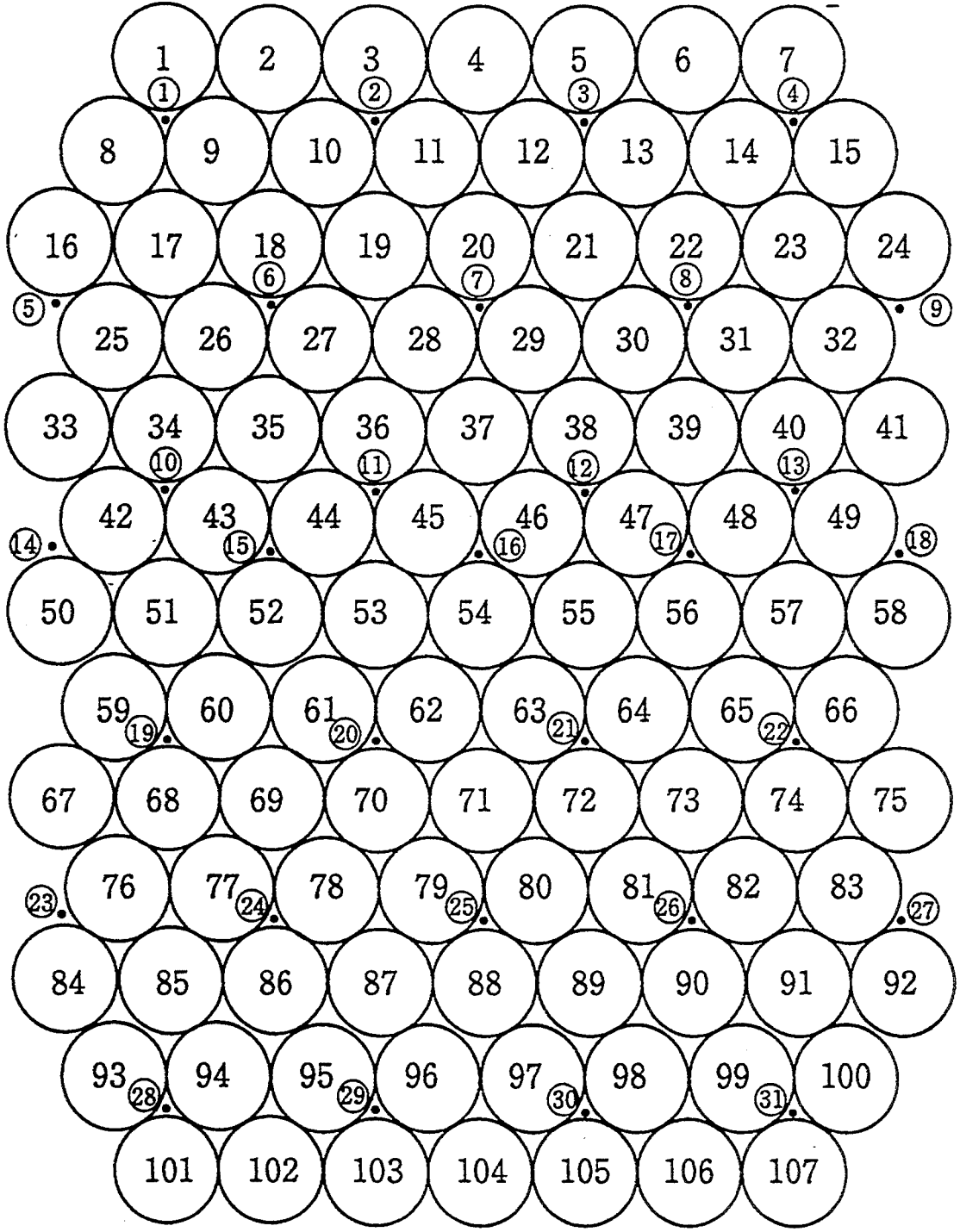
FIGS. 2A and 2B schematically illustrate positional relationships between reference light sources (LED) and photomultiplier tubes (PMT) employed in the first scintillation camera system shown in FIG. 1.

FIG. 2A pictorially represents an arrangement of the above-described photomultiplier tubes 4 and reference light sources 5. Namely, in FIG. 2A, there is shown a positional relationship between 107 pieces of photomultiplier tubes 4 and 31 pieces of light emitting diodes 5.

The light emitting diodes 5 emit green light similar to the scintillation light, or colored light close to ultraviolet preferably. As apparent from FIG. 2A, roughly speaking, only three LEDs 5 are arranged in relation to ten multiplier tubes 4 in such a manner that one LED (No.1) is positioned immediately contiguous to three photomultiplier tubes (Nos. 1, 8 and 9).

Figure 2B:
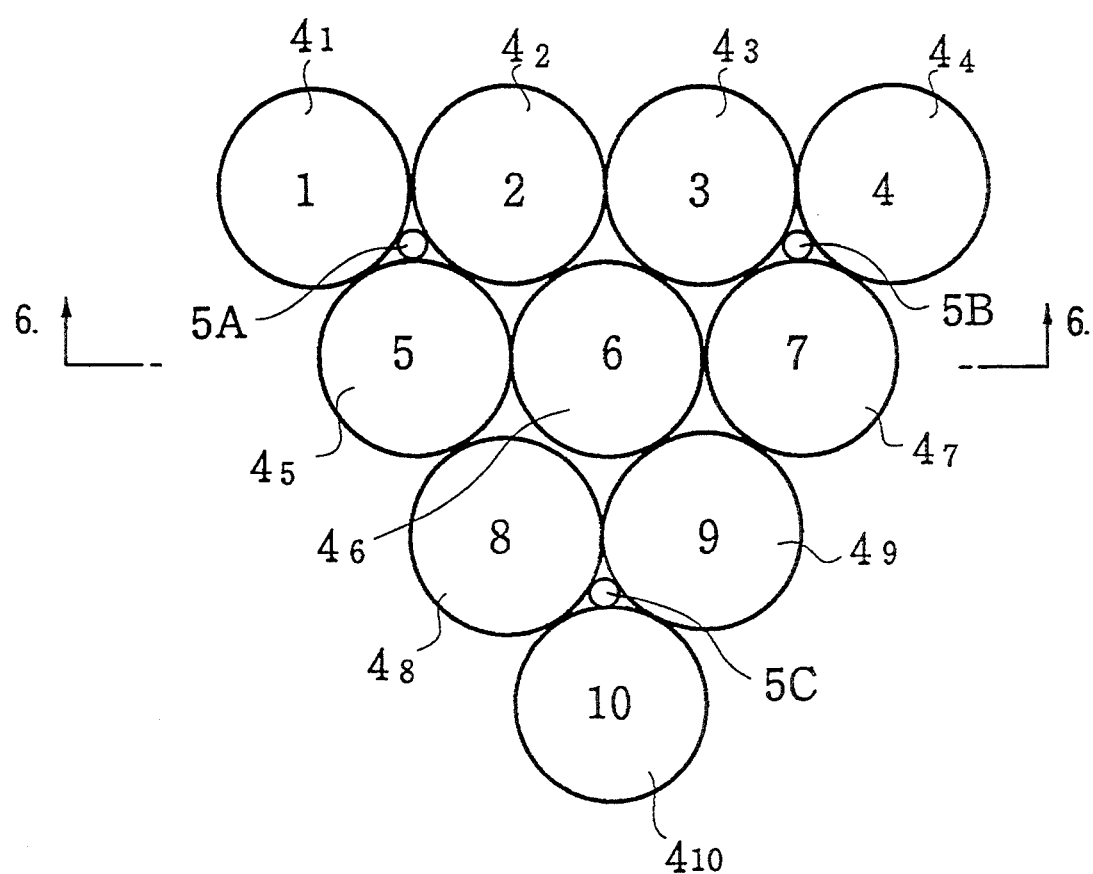

More specifically, this positional relationship will now be explained with reference to a partial diagram of the arrangement shown in FIG. 2B. For instance, when the output signal from the First photomultiplier tube $4_1$ is corrected, the light output from the first LED 5A is used, whereas when the output signal from the sixth photomultiplier tube $4_6$ is corrected, the light outputs simultaneously derived from the first, second and third LED 5A, 5B and 5C are used, because of its equidistance position.

These positional relationships are listed in a TABLE 1

TABLE 1

| photomultiplier tube No. | LED No. for correction |
| --- | --- |
| $4_1$ | 5A |
| $4_2$ | 5A |
| $4_3$ | 5B |
| $4_4$ | 5B |
| $4_5$ | 5A |
| $4_6$ | 5A, 5B, 5C |
| $4_7$ | 5B |
| $4_8$ | 5C |
| $4_9$ | 5C |
| $4_{10}$ | 5C |

As apparent from FIG. 2A, a total number of LEDs 5 may be ⅓ in the first scintillation camera system, as compared with the above-described total number of reference light sources in the conventional scintillation camera system.

Practical Circuit Arrangement of First Scintillation Camera System

Figure 3:
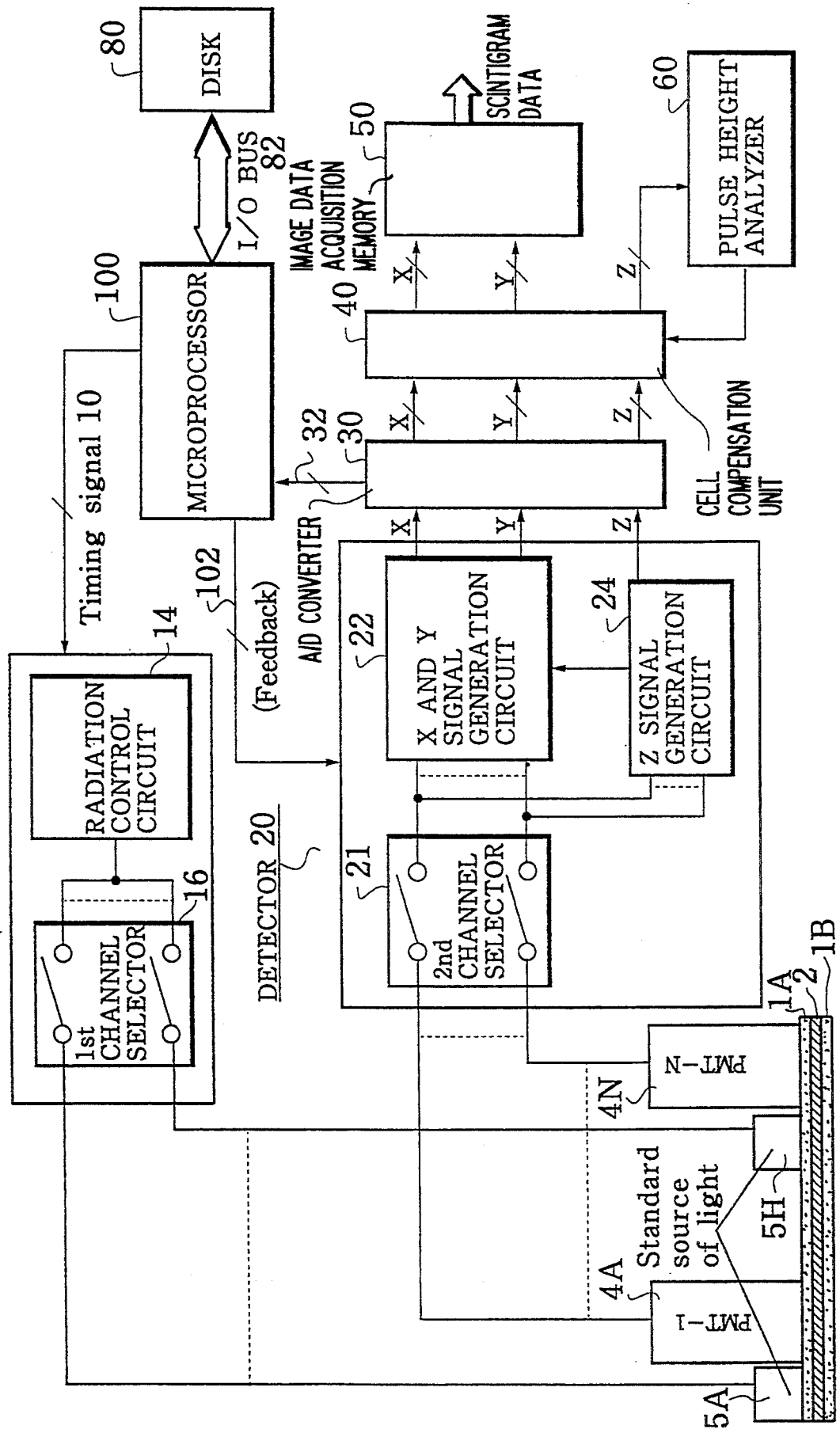
FIG. 3 is a schematic circuit block diagram of the first scintillation camera system shown in FIG. 1.

FIG. 3 shows a practical circuit arrangement of the above-described first scintillation camera system of FIG. 1. It is to be noted that the circuit in FIG. 3 is an exemplary device which can perform the functions performed by the device in FIG. 1 but there is not a one to one correspondence between the elements in FIGS. 2 and 3.

Figure 5:
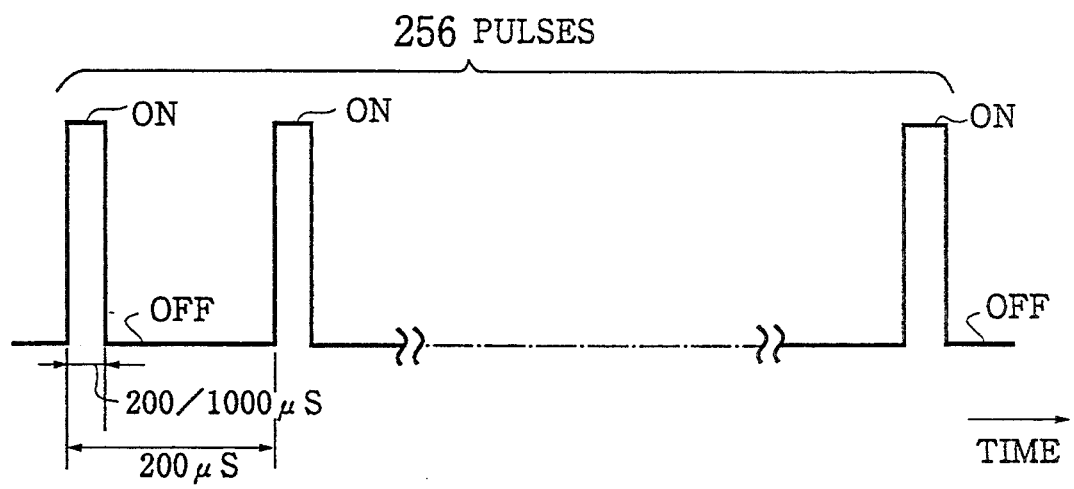
FIG. 5 pictorially explains a pulsatory drive mode of the reference light sources employed in the first scintillation camera system.

In FIG. 3, a microprocessor 100 is employed to control all circuit elements of the first scintillation camera system and also to perform the defect detecting method of the major feature of this first preferred embodiment (will be described in detail). From this microprocessor 100, a timing signal 10 is supplied to a radiation control unit 12. The radiation control unit 12 includes a radiation control circuit 14 and a first channel selector 16. The first channel selector 16 is connected to the light emitting diodes 5A to 5H (symbol "H" being 31 in this preferred embodiment), namely 31 LEDs 5A to 5H. In other words, the first channel selector 16 owns 31 output terminals connected to these LEDs 5. In response to a radiation control signal derived from the radiation control circuit 14, the selected LED, or LEDs 5 are turned ON/OFF in a pulsatory driving mode. That is, the LED 5 is driven in the pulsatory mode using 256 ON/OFF times/second. As represented in FIG. 5, 1-ON/OFF time period is selected to be approximately 200 microseconds and a duty ratio of ON-time to OFF-time is about 1/1000. It should be noted that the above-described numerical data such as 200 microseconds are merely given as examples.

Referring back to FIG. 3, a plurality of photomultiplier tubes "PMT-1" to "PMT-N" (symbol "N" being 107) are connected to a second channel selector 21 of a detector 20. The output signals from the second channel selector 21 are supplied not only to an X/Y-signal generation circuit 22, but also to a Z-signal generation circuit 24. The X/Y-signal generation circuit 22 generates an X signal and a Y signal, which represent positional information about a scintillation signal derived from the photomultiplier tubes 4A, - - -, 4N. The Z-signal generation circuit 24 generates a Z signal which represents an energy level of the scintillation signal, by adding the scintillation signals with each other.

Then, these X signal, Y signal and Z signal are A/D-converted by an analog-to-digital converter 30, thereby obtaining X data. Y data and Z data. These X, Y, and Z data are supplied to a CEL compensation circuit 40 and also to the microprocessor 100. The CEL compensation circuit 40 compensates for energy and linearity of the scintillation signal (symbol the "CEL" implies correction of energy and linearity). Thereafter, the compensated X and Y data are stored into an image data acquisition memory 50 from which scintillation image (scintigram) data of a patient (not shown) is read out, if required. A pulse height analyzer 60 is employed to receive the compensated Z data, so that a pulse height of this Z data is analyzed.

As previously explained, since the X, Y and Z data from the A/D converter 30 are furnished via a data bus 32 to the microprocessor 100, the defect detecting method and the automatic defect analysis according to the present invention can be executed in the microprocessor 100 (will be described in detail.).

A disk memory 80 is employed so as to be accessed by the microprocessor 100. The disk memory 80 previously stores therein initial gain values for the LEDs 5 and the photomultiplier tubes 4. The disk memory 80 is connected via an I/O bus 82 to the microprocessor 100.

In accordance with the present invention, the reference light sources are not limited to LEDs, but also any other light sources such as light sources with glass fibers.

Defect Detecting Method By First Scintillation Camera System

Figure 4:
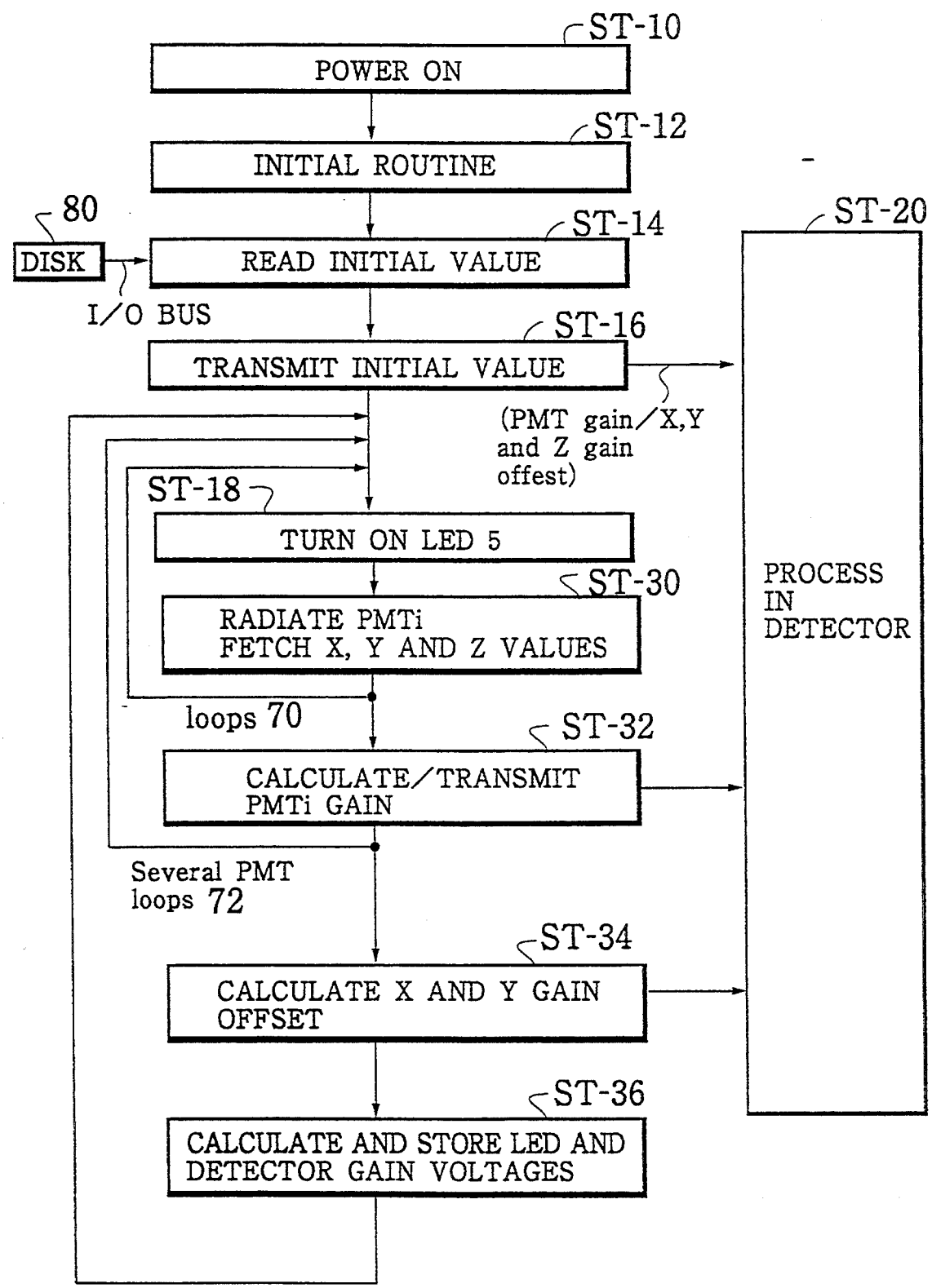
FIG. 4 is a flow chart for explaining the defect detecting method effected by the first scintillation camera system.

Referring now to a flow chart shown in FIG. 4, a detailed description will be made of the defect detecting method by the first scintillation camera system of FIG. 3.

First, an overall operation of this camera system is performed as follows:

At a first step ST-10, a power supply (not shown in detail) of this first scintillation camera system is turned ON. At a next step ST-12, an initial routine of this camera system is commenced. Thereafter an initial value such as a PMT (photomultiplier tube) gain offset value and X, Y, Z-gain offset values required to execute this defect detecting method, is read out from the disk memory 80 via the /0 bus 82 at a step ST-14. This initial value is transmitted to the detector 20 at a step ST-16. That under control of the microprocessor 100, the initial value such as the PMT gain offset value, and X, Y, Z-gain offset values read out from the disk memory 80 is supplied via a signal (feedback) path 102 to the detector 20 (see FIG. 3). The PMT gain offset value is used in connection with the Z-gain offset value in the Z-signal generation circuit 24 to perform PMT/Z-signal gain offset operations, whereas the X-gain offset value and the Y-gain offset value are supplied to the X/Y-signal generation circuit 22 together with the PMT gain offset value to execute PMT/X and Y signal gain offset operations.

Subsequently, at a step ST-18, the timing signal 10 is supplied from the microprocessor 100 to the radiation control unit 12 so that a preselected reference light source, i.e., LD 5A to 5H is powered to emit pulsatory green light. A a subsequent step ST-30, a predetermined PMT (e.g., first photomultiplier tube 4A) is energized fetch scintillation light. Thus, this scintillation light is outputted from this PMT as a scintillation signal. Based upon this scintillation signal, X, Y and Z signal values are fetched from the X/Y signal generation circuit 22 and the Z signal generation circuit 24 into the microprocessor 100. These reference light radiation and scintillation signal fetch are repeatedly carried out with respect to the remaining PMTs through loops 70.

Then, For instance, a signal gain of the first PMT 5A is calculated under control of the microprocessor 100 based on the fetched X, Y and Z signal values (namely X, Y, Z signal data from the A/D converter 30), the resultant signal gain of the PMT 5A is transmitted through the feedback path 102 to the detector 20 at a step ST-32. This PMT gain calculation is repeated several times through a PMT loop 72. Accordingly, signal gains of the other PMTs 5 are calculated and sent to the detector 20.

AL a further step ST-34, both an X gain offset value and a Y gain offset value are calculated under control of the microprocessor 100, which will then be supplied to the detector 20. Also, gain voltages of LEDs 5 and the PMTs are calculated and then stored into the disk memory 80 under control of the microprocessor 100 at a step ST-36 and the process is terminated. If desired, the steps of ST-18, ST-30, ST-32, ST-34 and ST-36 can be repeated.

The process in ST-20 uses the calculated gains in the detector 20 of FIG. 3 to correct the outputs of the PMTs.

Now, the defect detecting method of the first scintillation camera system will be explained, taking account of a concrete example.

Assuming now that two defects occur:

1). A gain of the first LED 5A (light output amount thereof) becomes ½, as compared with its reference gain; and 2) A gain of the first PMT $4_1$ becomes ½, as compared with its reference gain (see FIG. 2B).

In case of 1), gains of the three PMTs $4_1$, $4_2$ and $4_5$ becomes ½, the output levels of which are corrected by utilizing the first LED 5A, whereas a gain of the sixth PMT $4_6$, becomes 5/6, as compared with the respective reference gains. Under control of the microprocessor 100, variations obtained in the measured gains of the PMTs $4_1$, $4_2$, $4_5$ and $4_6$ are investigated or compared by a comparing means such as the microprocessor 100 based upon the reference gains thereof. IF such large variations happen to occur, then the defect of the first reference light source, i.e., LED 5A can be judged.

In case of 2), only a gain of the first PMT 4, becomes ½, whereas gains of other PMTs $4_2$, $4_5$ and $4_6$ do not change, namely remain at their reference gains. Accordingly, under control of the microprocessor 100, the defect of the first PMT $4_1$ can be judged.

As previously described in detail, discrimination can be done whether the reference light source becomes defective, or the photomultiplier tube becomes defective by investigating the variations in the light (emission) outputs from the reference light sources with reference to their reference values, and also the variation distribution of the PMT different from the variation distributions of other PMTs.

It should be noted that these judgements can be achieved under such a condition that the variation amount in the emission amounts of the reference light sources must be constant with reference to the temperature variations. To this end, the reference light sources having small fluctuation of the temperature variation coefficient must be previously selected.

On the other hand, when such a defect happens to occur, a warning signal 71 is produced from the radiation sensitivity control unit 7, so that a warning indication is displayed on a monitor (not shown) under control of the microprocessor 100 (see FIG. 1). As a result, an operator can readily become aware of such a detective case and can immediately replace the defective component by a new component.

Figure 6:
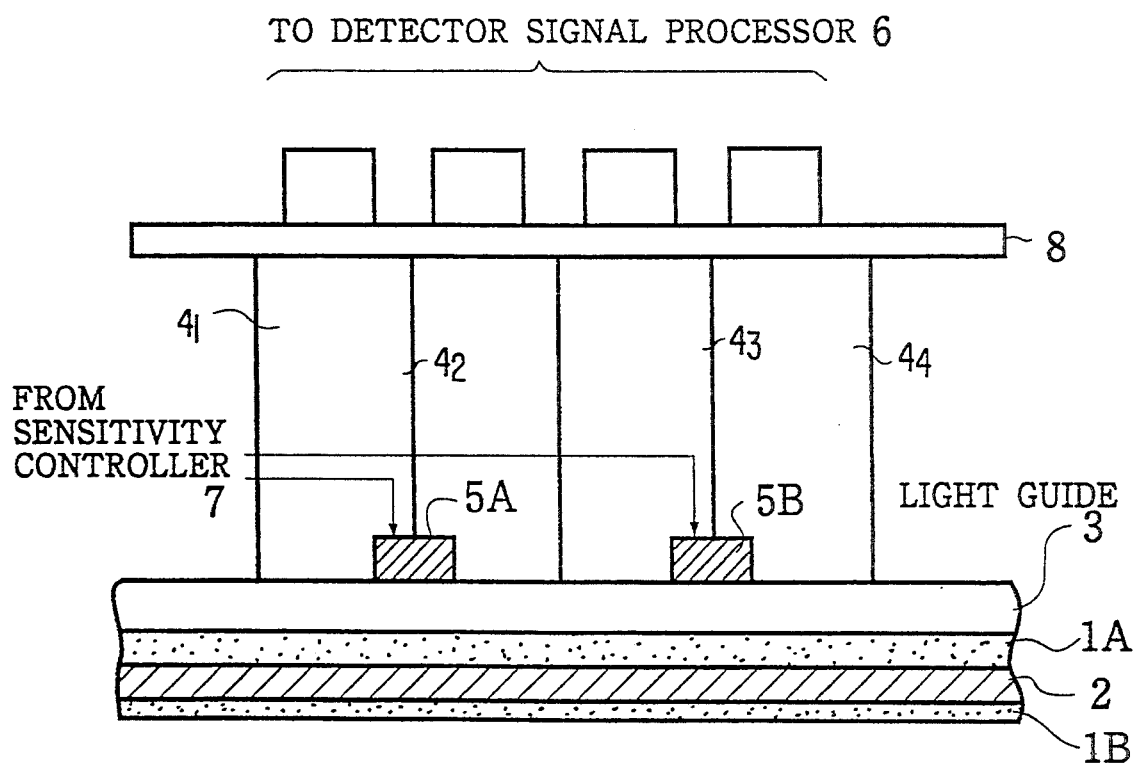
FIG. 6 schematically represents a modification of the first scintillation camera system.

As a modification of the first scintillation camera system, the reference light sources 5A, ---, 5N may be mounted on the light guide 3 as shown in FIG. 6. Also, the reference light sources 5A, ---, 5N may be fixed on the upper surface of the supporting plate 8. Alternatively, portions of these reference light sources 5A, ---, 5N may be embedded in the supporting plate 8.

As previously explained, discrimination can be done whether or not the photomultiplier tube becomes defective by checking the variations contained in the light outputs of the LEDs with reference to the reference values of the LEDs in accordance with the first preferred embodiment. Moreover, according to another aspect of the present invention, the sensitivities of the photomultiplier tubes 4A, ---, 4N may be tuned by similarly checking such a light-output variation. This tuning operation of the photomultiplier tube is known in the art, for instance, by controlling the tube voltage.

Second Scintillation Camera System

Figure 7:
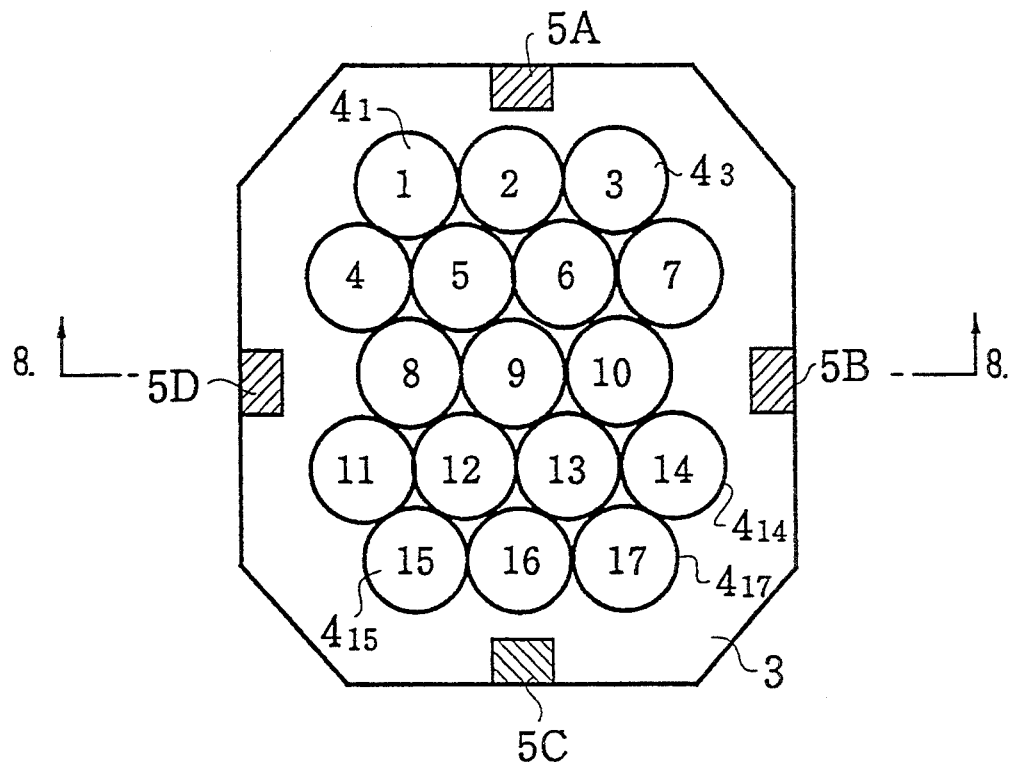
FIG. 7 schematically represents a positional relationship between 4 LDs and 17 PMTs employed in a gamma ray detector o another scintillation camera system according to a second preferred embodiment of the present invention.
Figure 8:
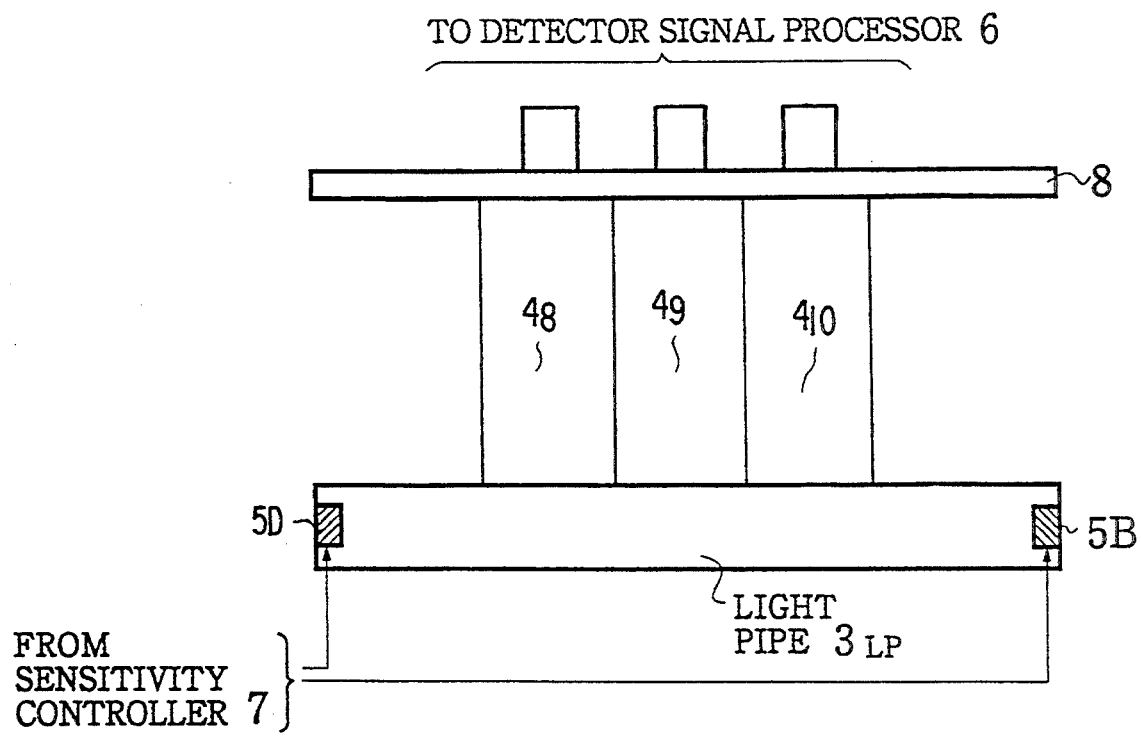
FIG. 8 schematically shows a major arrangement of the second scintillation camera system and is a cross-sectional view of the system illustrated in FIG. 7 taken along line 8L.

Referring now to FIGS. 7 and 8, another scintillation camera system according to a second preferred embodiment of the present invention will be described.

FIG. 7 represents a detector unit in which 17 photomultiplier tubes $4_1$, ---, $47_{17}$ are arranged in such a manner as shown in this drawing, and 4 light emitting diodes 5A to 5D are mounted on four edge portions along orthogonal lines passing through a rectangular outline shape of these photomultiplier tubes.

As represented in FIG. 7, 17 photomultiplier tubes $4_1$, ---, $4_{17}$ are arranged on a hollow light guide "$3_{LP}$" and the reference light sources (LEDs) 5A to 5D are symmetrically positioned with each other.

In this second scintillation camera system, either a single LED 5, or plural LEDs 5 are pulsatory-turned ON/OFF to project a constant amount of light to the respective photomultiplier tubes $4_1$, ---, $4_{17}$. Then, output signals from the detector signal processor 6 are used to execute a feedback control by the sensitive control unit 7 and also to investigate variations in the outputs from the LEDs 5 and the photomultiplier tubes 4. As a consequence, the above-described defect detecting method and defect discriminating method of the present invention can be carried out.

When such a feedback control is performed to equalize the scintillation signal outputs of the photomultiplier tubes 4 in both of the first and second preferred embodiments, a plurality of LEDs 5 are preferably turned ON/OFF in the pulsatory drive mode at the same time (see FIG. 5).

While the present invention has been described in detail, the scintillation camera system of the invention has various advantages. Since a total number of reference light sources are considerably reduced as compared with that of the conventional scintillation camera system, which are used to control the sensitivities of the photomultiplier tubes, the entire circuit arrangement of the sensitivity control unit 7 can be made simple. Accordingly, the manufacturing cost of the scintillation camera system can be lowered. Moreover, as a result of a few reference light sources, fluctuation in the output characteristics of the reference light sources can be suppressed, so that high-precision output corrections of the photomultiplier tubes can be improved.

Furthermore, according to the defect detecting method for the scintillation camera system of the present invention, when the light emission amount of the reference light source happens to be reduced due to its defect or malfunction, the variations contained in the scintillation signal outputs from the respective photomultiplier tubes exceed a predetermined value. Since these variations are continuously investigated, or monitored, such a defect of the reference light source can be immediately detected. As a consequence, equality of the scintillation signal output of each photomultiplier tube, a linearity and precision thereof can be improved. Moreover, as the higher performance of the scintillation detector can be maintained, the image quality of the scintigram can be improved.

We claim:

1. A method for detecting a defect in a scintillation camera wherein at least one reference light source is used with a plurality of photomultiplier tubes, and a total number of the reference light sources is smaller than that of the photomultiplier tubes, comprising the steps of:

presetting a reference light gain of said at least one reference light source into a memory;

irradiating light from said at least one reference light source to said plurality of photomultiplier tubes, to obtain scintillation signals having gains which are respective to the photomultiplier tubes;

sequentially comparing the gains of the scintillation signals derived from the respective photomultiplier tubes with said reference light gain of said at least one reference light source read out from the memory; and judging whether or not a variation contained in the compared gains of the respective photomultiplier tubes exceeds a predetermined value, to detect a defect of said at least one reference light source.

2. A defect detecting method as claimed in claim 1, wherein said at least one reference light source includes at least three reference light sources and said plurality of photomultiplier tubes includes at least ten photomultiplier tubes, wherein said at least three reference light sources are positioned adjoining to said at least ten photomultiplier tubes, and further comprising the steps of:

simultaneously irradiating light from said at least three reference light sources on one of said ten photomultiplier tubes, which is separated from said three reference light sources at an equidistance, to obtain a first scintillation signal having a first gain; and comparing said first gain of the first scintillation signal with said reference light gain read out from the memory.

3. A defect detecting method as claimed in claim 1, wherein said step of irradiating light drives said at least one reference light source, to produce a pulsatory light output.

4. A method of detecting a defect in a scintillation camera wherein at least one reference light source is used with a plurality of photomultiplier tubes, and a total number of the reference light sources is smaller than that of the photomultiplier tubes, comprising the steps of:

presetting a reference gain of a scintillation signal of at least a first photomultiplier tube into a memory;

irradiating light from said at least one reference light source to said plurality of photomultiplier tubes including said first photomultiplier tube to produce scintillation signals having gains respective to the photomultiplier tubes; and sequentially comparing the gains of the scintillation signals derived from the respective photomultiplier tubes with said reference gain of the scintillation signal of the first photomultiplier tube read out from the memory, and checking whether or not said compared gains of the respective photomultiplier tubes exceeds a predetermined value to determine if a defect of said photomultiplier tubes exists.

5. A defect detecting method as claimed in claim 4, wherein said at least one reference light source includes at least three reference light sources and said plurality of photomultiplier tubes includes at least ten photomultiplier tubes, wherein said at least three reference light sources are positioned adjoining to said at least ten photomultiplier tubes, and further comprising the steps of:

simultaneously irradiating light from said at least three reference light sources to one of said ten photomultiplier tubes, which is separated from said at least three reference light sources at an equidistance, thereby obtaining a first scintillation signal having a first gain; and comparing said first gain of the first scintillation signal with said reference gain read out from the memory.

6. A defect detecting method as claimed in claim 4, wherein said step of irradiating light drives said at least one reference light source in a pulsatory mode, to produce a pulsatory light output.

7. A scintillation camera system comprising:

a plurality of photomultiplier tubes for outputting scintillation signals;

at least three reference light sources positioned proximate to said plurality of photomultiplier tubes, one of said plurality of photomultiplier tubes being equidistantly separated from said at least three reference light sources;

signal processing means, connected to said plurality of photomultiplier tubes, for processing the scintillation signal outputs from said plurality of photomultipliers tubes to produce feedback signals;

controlling means, connected to said at least three reference light sources, for controlling radiation from said at least three reference light sources;

means for determining respective gains of said scintillation signal outputs of said plurality of photomultiplier tubes;

means for determining a reference light gain of at least one of said at least three reference light sources;

storage means for storing therein said reference light gain of said at least one of said reference light sources; and comparing means for sequentially comparing said respective gains of said scintillation signal outputs of said plurality of photomultiplier tubes with said reference light gain of said at least one of said reference light sources read out from the storage means and outputting a result of said comparing; and determining means, connected to the comparing means, for determining if a defect of said at least one of said reference light sources exists using said result of said comparing.

8. A scintillation camera system as claimed in claim 7, wherein said reference light sources are light emitting diode for emitting substantially green colored light.

9. A scintillation camera system as claimed in claim 7, further comprising:

a fourth reference light source located such that all of said reference light sources are arranged around said plurality of photomultiplier tubes along orthogonal lines passing through said plurality of photomultiplier tubes.

10. A scintillation camera system comprising:

a plurality of photomultiplier tubes for outputting scintillation signals;

at least three reference light sources positioned proximate to said plurality of photomultiplier tubes, one of said plurality of photomultiplier tubes being equidistantly separated from said at least three reference light sources;

signal processing means, connected to said plurality of photomultiplier tubes, for processing the scintillation signal outputs from said plurality of photomultipliers tubes to produce feedback signals;

controlling means, connected to said at least three reference light sources, for controlling radiation from said at least three reference light sources;

means for determining respective gains of said scintillation signal outputs of said plurality of photomultiplier tubes;

storage means for storing a reference gain of a first scintillation signal output of at least a first of said photomultiplier tubes; and comparing means for sequentially comparing the respective gains of said scintillation signal outputs with said reference gain of the first scintillation signal output read out from said storage means and outputting a result of said comparing; and determining means, connected to said comparing means, for determining if a defect of said photomultiplier tubes exist using said result of said comparing, said defect of said photomultiplier tubes is determined to exist when said compared gains of the respective photomultiplier tubes exceeds said reference gain of said at least a first photomultiplier tube.

* * * * *